H. A. WICKHAM.
PRESS MOLD.
APPLICATION FILED OCT. 1, 1914.
1,239,652.
Patented Sept. 11, 1917.
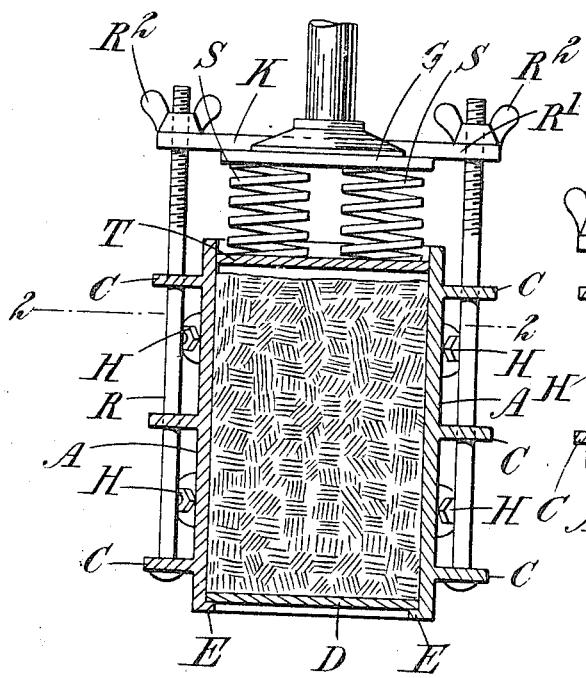
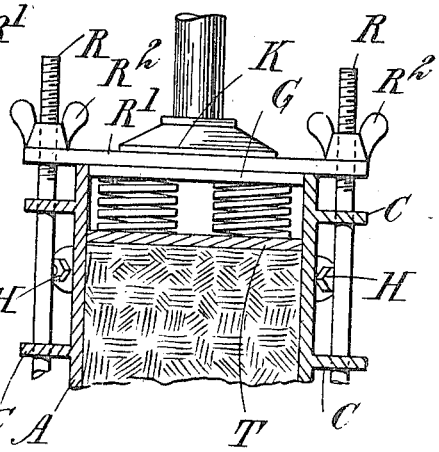
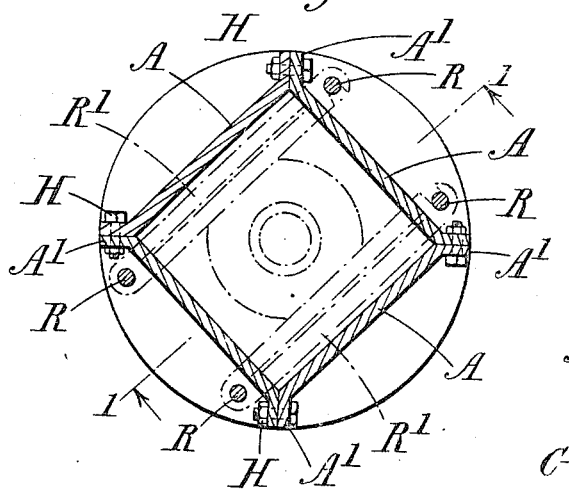
Witnesses
R. A. Balderson
G. B. Bleming
Inventor
Henry A. Wickham
by Bakewell, Byrnes & Parmelee
Attys.

UNITED STATES PATENT OFFICE.

HENRY ALEXANDER WICKHAM, OF LONDON, ENGLAND.

PRESS-MOLD.

1,239,652.

Specification of Letters Patent.  Patented Sept. 11, 1917.

Application filed October 1, 1914. Serial No. 864,423.

*To all whom it may concern:*

Be it known that I, HENRY ALEXANDER WICKHAM, a subject of the King of England, residing in London, England, have invented certain new and useful Improvements in Press-Molds; of which the following is a specification.

This invention relates to improvements in press-molds which are particularly applicable for molding or compressing various substances, such as tobacco and rubber.

The present invention comprises in combination a box-like press-mold, a piston-device adapted, by means of a press, to be moved toward and into the mold to apply pressure to the contents thereof, means to hold the said piston-device stationary as a whole after it has been released from the press, and other means thereafter to move the working face of the piston-device to accommodate any alteration in the bulk of the contents of the mold (for example to take up for any slack occurring therein).

Preferably the mold is built up of two or more independent sections secured together.

A feature of the invention consists in forming the walls of the molds with projections to accommodate bolts or the like, to which are secured cross-bars, cleats or the like, adapted to engage with the piston-device after it has been inserted within the mold and to hold it in its adjusted position.

Other features of the invention will be more clearly understood by reference to the following description taken in connection with the accompanying drawings which illustrate a preferred form of the apparatus and in which—

Figure 1 is a central sectional elevation taken on the line 1—1 of Fig. 2;

Fig. 2 is a section on the line 2—2 of Fig. 1;

Fig. 3 is a detail of a portion of the apparatus partly in section, and

Fig. 4 is a similar view to Fig. 1 of the upper portion of the apparatus after the piston-device has been forced into the mold and clamped in position.

Like letters indicate like parts throughout the drawings.

The mold or box is composed of four similar sections A, one of which is shown in sectional plan in Fig. 3, having extremities $A^1$ which provide meeting surfaces at the angles of the mold whereby the sections are clamped together by means of nuts and bolts indicated at H. The lower extremity of each of the sections A is flanged at E to provide a supporting ledge for a removable bottom plate D. Each of the sections A is provided with segmental flanges C in which are formed holes $C^1$ for the reception of longitudinal bolts R.

After the mold has been assembled as shown in the drawings, the material is charged into it and a plate T is placed within the mold on to the top of the material therein. Springs S pressing on the plate T are confined between the latter and another plate G and the apparatus is placed in a press of any convenient construction, the head of which is shown at K and pressure is applied until the contents of the mold and the springs are compressed sufficiently to allow the plate G preferably to enter within the top of the mold. Cross-bars $R^1$ are then swung across over the upper surface of the plate G and are secured in place by means of nuts $R^2$.

It will be seen therefore that in the case, for instance, of tobacco or rubber which may be the material undergoing treatment, it is compressed within the mold to a predetermined required degree and any moisture expressed therefrom may pass out through the interstices at the various joints of the apparatus, and between the edges of the plates T and G and the inner walls of the mold, and any slack which would otherwise occur by shrinkage of the contents of the mold during treatment, is taken up by the springs S which force the plate T continually into contact with the upper layer of the contents of the mold and thereby maintain, during the entire treatment in the mold, the required pressure upon the material.

The constructional form of press employed for initially forcing the plates T and G and the springs S on to the contents of the mold, is immaterial to the present invention and may be either a mechanical, hydraulic or other convenient construction. Moreover, the particular configuration of the mold may be modified according to the present invention to any desired form and although it has been illustrated as of square section, the invention is not in any way limited thereto. Further, instead of the coiled springs between the plates T and G, any other suitable means which will bring about the same effect, that is the effect of taking up for any slack occurring in the material or for allowing for any expansion in the bulk thereof, may be employed. Also, in place of the cross-bars R¹, cleats or any other convenient form of holding device to retain the plate G in place, may be utilized.

It will therefore be seen that with the apparatus above described the main object of the present invention is adequately attained, that is to say, a mold is provided of which the contents may be placed under pressure, which pressure is maintained during the whole of the time that the material in the mold is undergoing treatment (for example curing) irrespective of alterations which may occur in the bulk of the material.

What I claim as my invention and desire to secure by Letters Patent is:—

1. An open top mold having side walls and a bottom, a resilient pressure device having two members for compressing the material within the mold, springs interposed between the inner and outer members, and a screw clamping device on the mold for retaining the outer member in position relative to the mold after it has been moved a predetermined distance with relation thereto, the arrangement being such that the springs will move the inner member within the mold to follow up the material therein as it shrinks under the pressure of the springs; substantially as described.

2. A device of the character described for molding material which will shrink within the mold after the initial pressure is applied thereto, comprising a mold, a composite piston, said piston having two plates movable relative to each other, means for securing the outer plate to the mold section after the second plate has been pressed to a predetermined point within the mold, and springs interposed between said plates and arranged to move the inner plate of the piston relative to the outer plate to follow up and maintain the material under pressure while shrinking within the mold; substantially as described.

3. An open top mold having side walls and a bottom, a resilient pressure device having two members for compressing the material within the mold, the inner member being arranged to engage the side walls of the mold to be guided thereby, springs interposed between the inner and outer members, and an adjustable clamping device on the mold for retaining the outer member in position relative to the mold after it has been moved a predetermined distance with relation thereto, the arrangement being such that the springs will move the inner member within the mold to follow up the material therein as it shrinks under the pressure of the springs; substantially as described.

4. A device of the character described for molding material which will shrink within the mold after the initial pressure is applied thereto, comprising a plurality of sections each having a mold-forming portion and end flanges, means for securing said sections together, a composite piston, said piston having two members movable relatively to each other, means for securing the outer member to the said mold-forming sections after the piston has been pressed to a predetermined point with relation to the mold, and springs interposed between the said members and arranged to move the inner member of the piston relatively to the outer members to follow up and maintain the material under pressure while shrinking within the mold, substantially as described.

In testimony whereof I have signed my name to this specification in the presence of two subscribing witnesses.

HENRY ALEXANDER WICKHAM.

Witnessses:
   LESLIE GEORGE EVES,
   HARRY B. BRIDGE.